(12) United States Patent
Cerruti et al.

(10) Patent No.: US 7,921,454 B2
(45) Date of Patent: *Apr. 5, 2011

(54) SYSTEM AND METHOD FOR USER PASSWORD PROTECTION

(75) Inventors: Julian A. Cerruti, Buenos Aires (AR); Stefan Nusser, Los Altos, CA (US); Jerald Thomas Schoudt, Douglassville, PA (US); Gustavo Stefani, Ciudad Autonoma de Buenos Aires (AR); Eric Wilcox, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 834 days.

This patent is subject to a terminal disclaimer.

(21) Appl. No.: 11/876,416

(22) Filed: Oct. 22, 2007

(65) Prior Publication Data

US 2009/0106825 A1 Apr. 23, 2009

(51) Int. Cl.
*H04L 29/00* (2006.01)
(52) U.S. Cl. ............. 726/5; 726/1; 726/2; 726/3; 726/4; 726/19
(58) Field of Classification Search .................. 723/1–5, 723/19; 713/168–184
See application file for complete search history.

(56) References Cited

U.S. PATENT DOCUMENTS

| 6,246,769 | B1 | 6/2001 | Kohut |
| 6,747,676 | B2 | 6/2004 | Botz et al. |
| 7,124,433 | B2 | 10/2006 | Little |
| 2002/0180792 | A1 | 12/2002 | Broussard |
| 2005/0273625 | A1 | 12/2005 | Dayan et al. |
| 2006/0020559 | A1 | 1/2006 | Steinmetz |
| 2006/0284411 | A1 | 12/2006 | Wu |

FOREIGN PATENT DOCUMENTS

| WO | WO 2006/033531 A1 | 3/2006 |
| WO | WO 2006/135264 A1 | 12/2006 |

*Primary Examiner* — Brandon S Hoffman
*Assistant Examiner* — Helai Salehi
(74) *Attorney, Agent, or Firm* — Shimokaji & Associates, P.C.

(57) ABSTRACT

A system and method are disclosed for protecting a password assigned to a user, the method comprising: providing a password entry screen having a virtual keyboard, the virtual keyboard including a plurality of character keys arranged in a non-QWERTY format; authenticating the user if a password submitted by the user accessing the password entry screen matches a user password retrieved from a password database; and denying access to the user if the submitted password does not match the retrieved user password. The system comprises a storage module and a computer program for performing the method.

1 Claim, 5 Drawing Sheets

SYSTEM AND METHOD FOR USER PASSWORD PROTECTION

BACKGROUND OF THE INVENTION

The present invention relates generally to computer system security. More specifically, the present invention is related to a system and method for protecting the password of a user when using a public computer terminal.

It is often necessary for a computer system to allow a user to authenticate to a web-based application, such as Internet-based e-mail, from a public-access terminal or from some other public computer on which the user has limited or no control regarding computer security. However, it is becoming increasingly risky, from a computer security perspective, to merely require that the user enter a secret password at the public-access terminal. In particular, when the user is attempting to access confidential information from the computer system, conventional password protection may not be adequate.

The inadequacy of password protection may result from, for example, the possibility that an attacker could beforehand have modified the function of the public-access terminal with a spyware program. Such a program, which may include an off-the-shelf keystroke-recording program placed on the terminal, can operate to capture information entered by an authorized user. If the keystroke recording program records the user's password, for example, the attacker may use the password to subsequently gain access to the same information that the authorized user is permitted to access.

It is known in the relevant art to provide a virtual keyboard 11 on a computer display 10, as shown in FIG. 1, to guard against such keystroke-recording programs. During operation, the user enters a password by moving a mouse cursor 13 to 'click' on the appropriate sequence of virtual keys on the virtual keyboard, where the virtual keys are arranged in a conventional "QWERTY" format as shown. However, this method of security can be thwarted by a simple key logging program that records the cursor movements and clicks of the mouse, and then derives virtual keyboard key positions from the recorded cursor movements. Moreover, an attacker may employ the more sophisticated approach of using optical character recognition (OCR) software to identify, capture, and record the virtual keys being "struck" on the virtual keyboard.

From the above, it is clear that there is a need for a reliable system and method for providing secure access to a computing system from either a user's workstation or from a public terminal by avoiding key logging and OCR capture when entering a password.

SUMMARY OF THE INVENTION

In one aspect of the present invention, a method for protecting a password assigned to a user for access to a computer, the method comprises: providing a password entry screen having a virtual keyboard, the virtual keyboard including a plurality of character keys arranged in a non-QWERTY format; authenticating the user if a password submitted by the user accessing the password entry screen matches a user password retrieved from a password database; and denying access to the user if the submitted password does not match the retrieved user password.

In another embodiment of the present invention, a method for protecting a password assigned to a user comprises: providing a password entry screen having a virtual keyboard, the virtual keyboard including a plurality of character keys wherein at least one of the character keys is configured in an OCR-resistant format; authenticating the user if a password submitted by the user accessing the password entry screen matches a user password retrieved from a password database; and denying access to the user if the submitted password does not match the retrieved user password.

In another embodiment of the present invention, a system for protecting a password assigned to a user comprises: a storage module; a computer program for performing a method including the steps of: providing a password entry screen having a virtual keyboard, the virtual keyboard including a plurality of character keys, each character key having a character displayed thereon, the virtual keyboard configured such that the characters are arranged in a non-QWERTY format; authenticating the user if a password submitted by the user accessing the virtual keyboard matches a user password retrieved from the storage module; and denying access to the user if the submitted password does not match the retrieved user password.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. Various modifications to the exemplary embodiments will be readily apparent to those skilled in the art and the generic principles herein may be applied to other embodiments. The detailed description is thus not limited to the embodiments described below, but is made merely for the purpose of illustrating the general principles of the invention, since the scope of the invention is best defined by the appended claims, which are to be accorded the widest scope consistent with the principles and features described herein.

Disclosed herein is an innovative approach to improving the security of existing login-entering web applications. In contrast to conventional systems that use a traditional QWERTY-based keyboard layout for password entry, the approach includes a combination of a "virtual keyboard" with the addition of either or both randomly scrambling the key positions and using OCR-resistant characters. In addition, the user and system can optionally decide to request only a random subset of the characters of the user's password for authentication. Accordingly, new services that are currently not available for access from outside a company's Intranets, for example, could be made available via the Internet for casual access. This serves to improve the productivity of employees.

Figure 1:
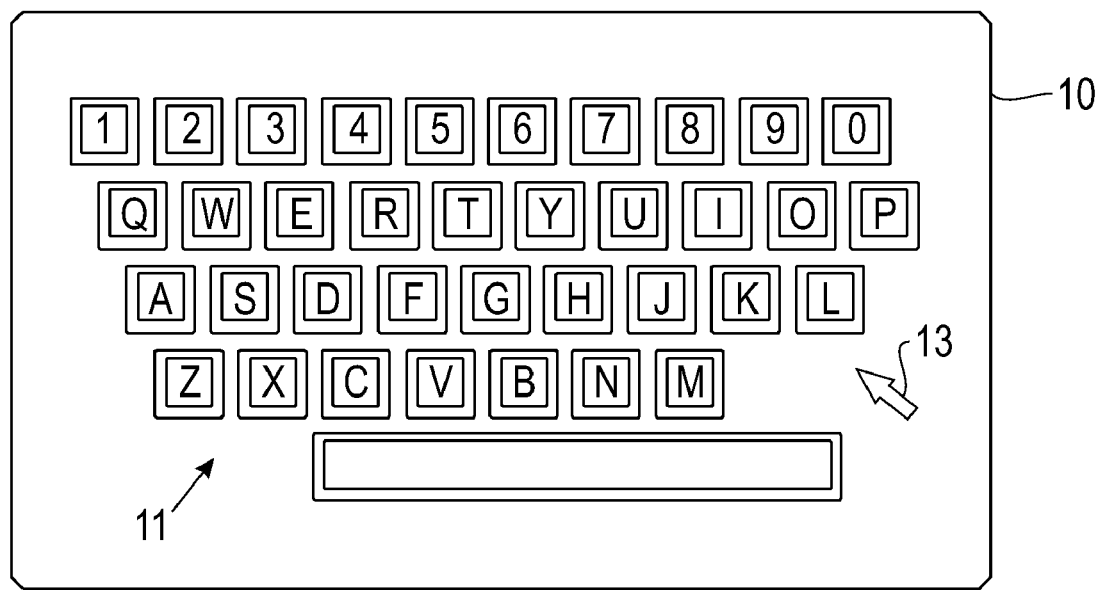
FIG. 1 is a diagrammatical illustration of a virtual standard QWERTY keyboard presented on a computer password entry screen, in accordance with the prior state of the art.
Figure 2:
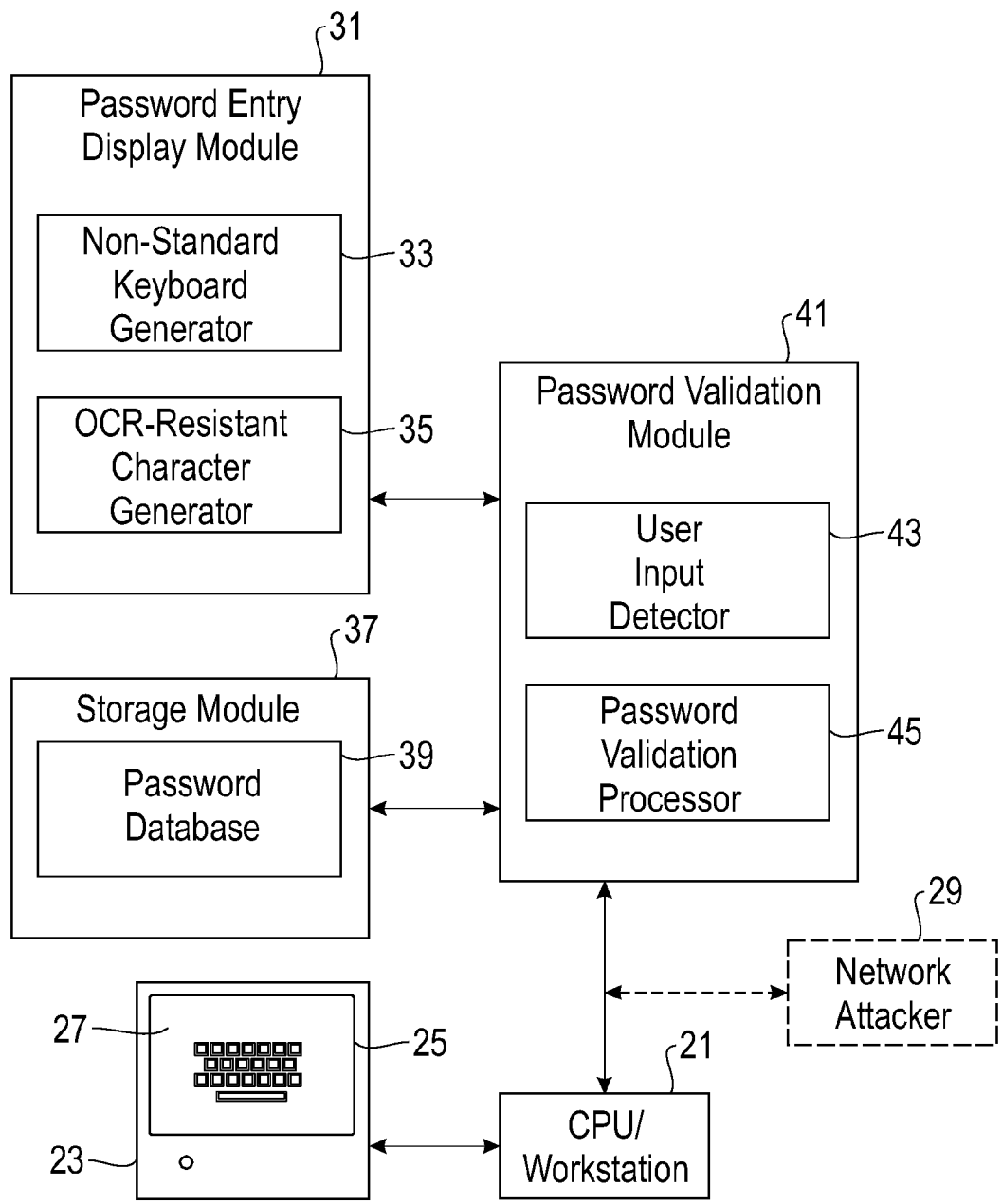
FIG. 2 is a functional block diagram of a computing system accessed by a user operating at a workstation with a display device, in accordance with the present invention.

FIG. 2 is a diagrammatical illustration of a computing system 30, such as may be used to execute a method of the present invention, according to an exemplary embodiment. The computing system 30 may be accessed by means of a workstation or central processor unit (CPU) 21 operated by a user via an input mechanism (not shown), such as a keyboard, number pad, or mouse, singularly or in combination. A display device 23 may provide feedback to the user for entering information into the computing system 30.

The computing system 30 may further include a password entry display module 31 for generating a virtual keyboard 27 in a password entry screen 25 on the display device 23. In accordance with the present invention, the virtual keyboard 27 may provide one of a plurality of unique, randomly generated keyboard configurations provided to protect the password of the user in the process of accessing the computing system 30. The password entry display module 31 may include a non-standard keyboard generator 33 for producing in the password entry screen 25 a virtual non-QWERTY keyboard display, that is, a keyboard having keys arranged in a pattern other than that found in conventional QWERTY keyboards. The password entry display module 31 may also include an OCR-resistant character generator 35 for formatting characters disposed on the keys of the virtual keyboard display into OCR-resistant characters, as explained in greater detail below.

The computing system 30 may include a storage module 37 for storing system data, such as user password information stored in a password database 39. The computing system 30 may also include a password validation module 41 for the detection and possible validation of a password entered at the CPU 21 by the user. The password validation module 41 may include a user input detector 43 for acquiring user keystrokes and mouse movements executed on the password entry screen 25, and a password validation processor 45 for comparing the user-submitted password to information stored in the password database 39.

The computing system 30 may function to prevent access by unauthorized users, here exemplified by a network attacker 29. In a typical scenario, the network attacker 29 may be a keystroke-monitoring virus that monitors and records the keystrokes and/or mouse movements entered by the user at the CPU 21. The network attacker 29 may subsequently retransmit such illicitly-recorded information to the computing system 30 to attempt to gain access to protected resources.

Figure 3:
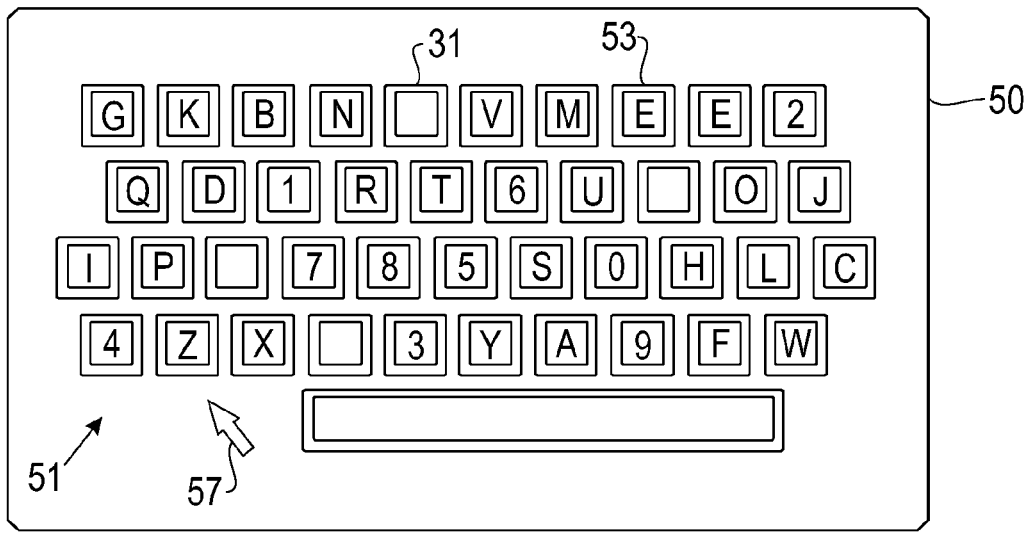
FIG. 3 is a diagrammatical illustration of an exemplary embodiment of a non-standard virtual keyboard with randomly-distributed keys on a password entry screen, as displayed on the display device of FIG. 2.

There is shown in FIG. 3 an exemplary embodiment of a password entry screen 50, in accordance with the present invention, displaying a virtual keyboard 51, where the key characters are arranged in a non-QWERTY format so as to deter the network attacker 29. It should be understood that the particular key character arrangement shown is for illustrative purposes only, and that other keyboard arrangements are contemplated. In an exemplary embodiment, the key characters on the virtual keyboard 51 may be randomly generated by a server such as the password entry display module 31 to produce a different non-QWERTY arrangement each time the user accesses the password entry screen 50. In typical operation, the server may request the user to enter a password by using the mouse cursor 13 to "click" on appropriate keys on the virtual keyboard 51. The positions of the "clicks" may be ascertained by the server to determine which of the keys on the virtual keyboard 51 were "struck."

The virtual keyboard 51 may also include one or more duplicate keys, such as a duplicate 'E' key 53, that can be used to enter the same character as another key. The virtual keyboard 51 may further include one or more "null" keys, such as blank key 55, that have no substantive effect when clicked on by the mouse cursor 57. These features function to prevent the possibility of a network attacker deriving the identity of the keystrokes from information obtained from the movements of the mouse cursor 57.

In an alternative exemplary embodiment, the password validation processor 45, in FIG. 2, may request a random subset of the characters that make up a user password, rather than expecting all the characters of the password to be entered. For example, in another exemplary embodiment of a virtual non-standard keyboard 61, shown in FIG. 4, a mouse cursor 65 may be used to click on successive characters and a password entry window 63 may be used to provide password character entry progress to the user in a password entry screen 60, where entered characters may be indicated by asterisks, for example.

Figure 4:
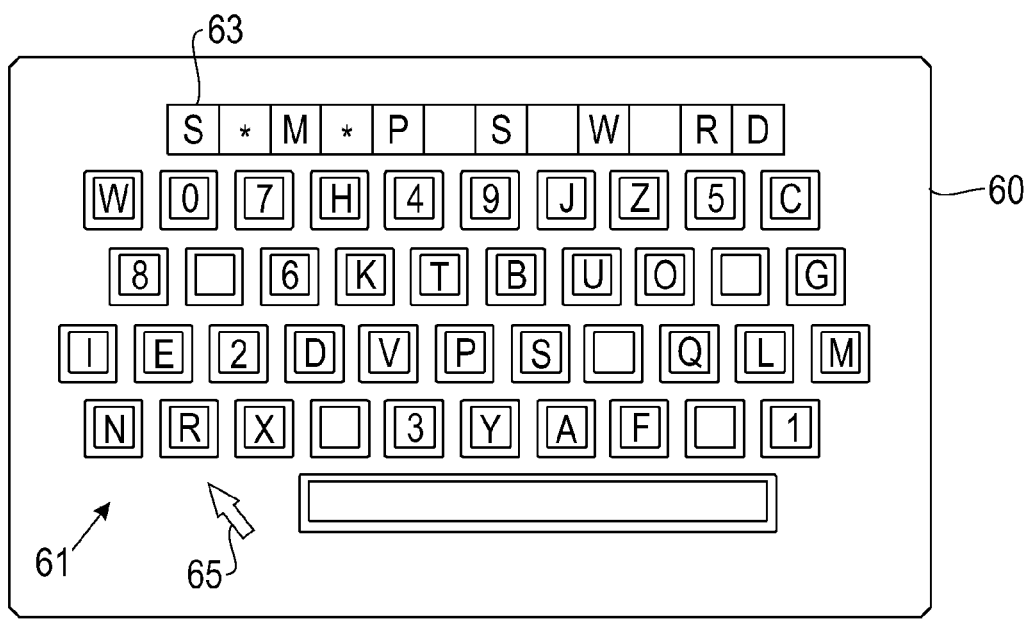
FIG. 4 is a diagrammatical illustration of the non-standard virtual keyboard and a partially-completed user password on a password entry screen, as displayed on the display device of FIG. 2.

In this way, even if the network attacker 29 is successful in acquiring the identity of the selected keys, this information will still be incomplete and will not allow the network attacker 29 access to the computer system 30. In the example provided, the required password in the password entry window 63 is "SOMEPASSWORD." The password entry display generator 31, in FIG. 2, may prompt the user to enter "O," "E," "A," "S, and "O", that is, the second, fourth, sixth, eighth, and tenth characters of the password. Accordingly, the user may be authenticated after completing entry of fewer than all characters of the user password. It should be understood that, for security purposes, the remaining characters of the password, "S-M-P-S-W-RD," may not be provided on the password entry screen 60 or otherwise displayed. These are shown in FIG. 4 only for purpose of illustration.

In another alternative exemplary embodiment, the glyph of each keyboard character may be altered or geometrically modified so as to prevent OCR recognition of the keyboard character. In the simplest case, each individual character may be given a rotational orientation different from the standard 'vertical' configuration on a conventional keyboard display. A character may be rotated 90° clockwise, for example, to deter character recognition, but can be correctly 'read' by the user.

Figure 5:
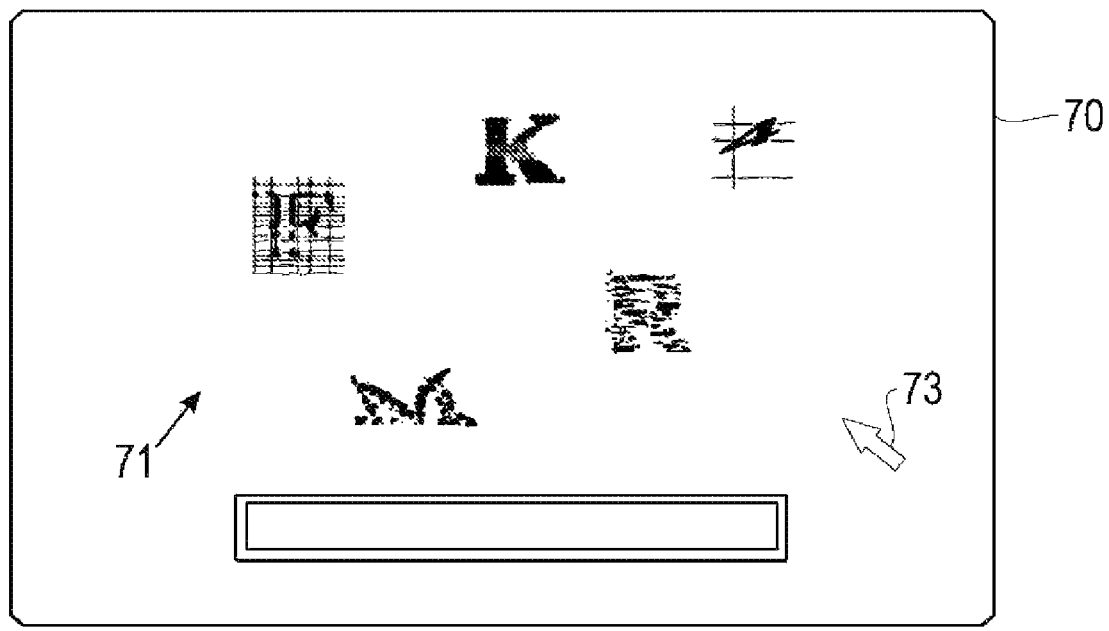
FIG. 5 is a diagrammatical illustration of OCR-resistant characters on a password entry screen for selection by a mouse cursor, as displayed on the display device of FIG. 2.

Alternatively, a completely automated public Turing test to tell humans and computers apart, or CAPTCHA system, can be applied to reformat one or more letters and numbers separately for OCR-avoidance. OCR avoidance can be accomplished, for example, by the addition of any or all of: (i) vertical or horizontal background lines, (ii) speckles or image "noise," and (iii) geometric distortion of the character. In the example shown in FIG. 5, a password entry display 70 provides an array 71 of OCR-resistant characters "F," "K," "4," "M," and "R" for selection by a mouse cursor 73.

Figure 6:
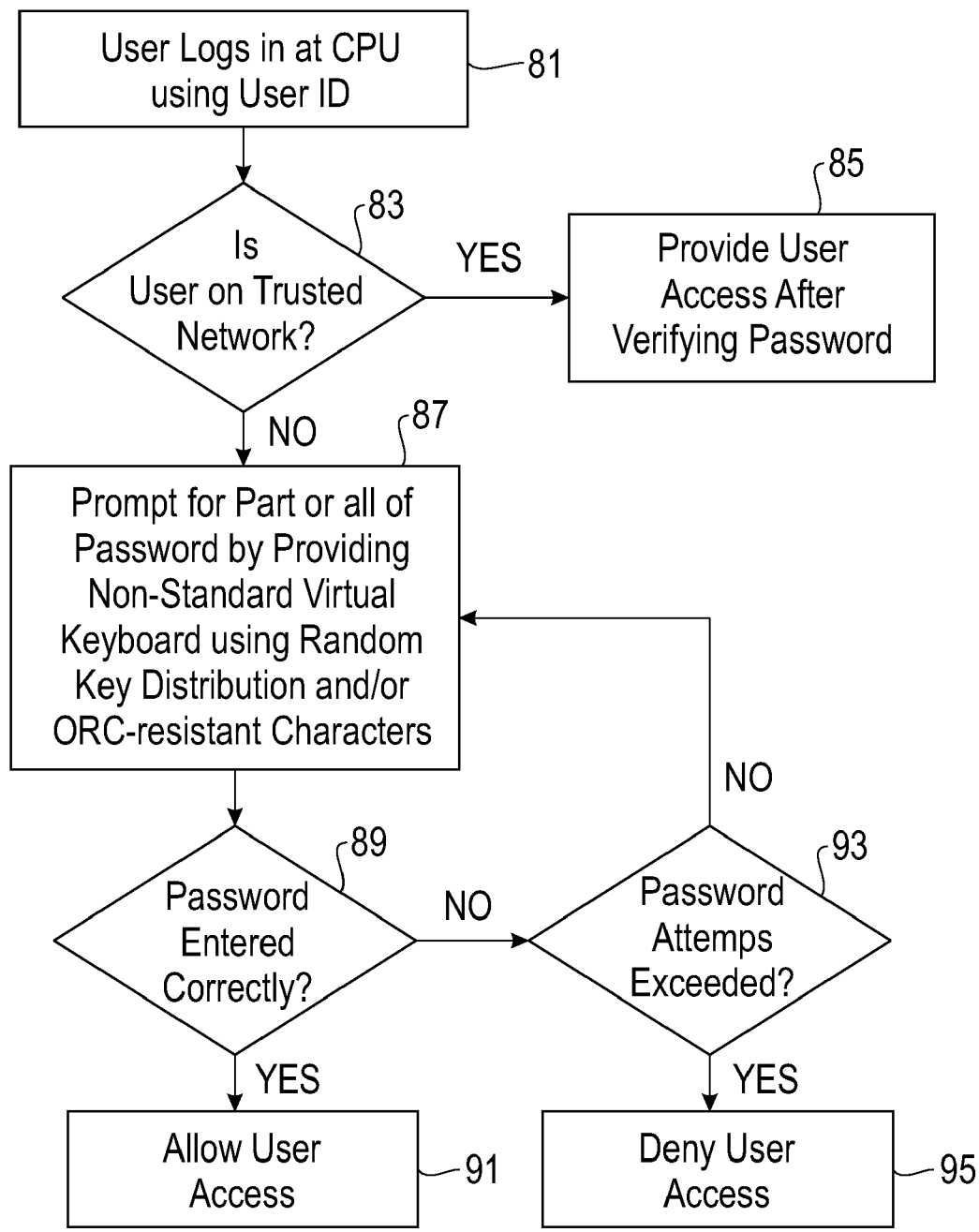
FIG. 6 is a flow diagram describing operation of the computing system of FIG. 2, in accordance with the present invention.

Operation of the computing system 30 may be described with reference to both FIG. 2 and a flow diagram 80 shown in FIG. 6. The user may log on at the CPU 21 using an appropriate identification process, at step 81. The computing system 30 may ascertain whether or not the user is in communication over an "untrusted network," at decision block 83. If the user is working on a trusted terminal, such as a regular office workstation, the user can remain in a "trusted-network" security mode by selecting to use a conventional password entry method suitable for an office environment. If desired, the network and the password can be "remembered" by the application at the trusted terminal. Access may then be provided to the user after the correct password has been entered, at step 85. Accordingly, the remaining steps 87 through 95 may be bypassed if the user is working on a trusted terminal.

If the computing system 30 cannot establish that the user is in a trusted network, operation may switch over to an untrusted network security mode, and the user may be presented with one of the password entry screen 50, the password entry screen 60, or the password entry screen 70 described above, at step 87. A password entered by the user may be verified at decision block 89. If the user has entered the correct password, access may be granted to the user, at step 91.

If the entered password is incorrect, at decision block 89, the user may be granted another attempt if the allowed number of password entry attempts has not been exceeded, at decision block 93. If the number of allowed attempts at password entry has not been exceeded, operation may return to step 87 and the user may again be presented with one of the password entry screens 50, 60, or 70. If the number of allowed attempts at password entry has been reached, the user may be denied access, at step 95.

Although the embodiments of the present invention are described in the context of a system log-in, one of ordinary skill in the art will readily recognize that the embodiments of the present invention can be utilized in any situation where a user is prompted to enter a password. For example, the user may desire to access a software module or sensitive data on a server.

It should be understood that, while the invention has been described in the context of fully functioning computers and computer systems, those skilled in the art will appreciate that the various embodiments of the invention are capable of being distributed as a software and firmware product in a variety of forms, and that the invention applies equally regardless of the particular type of signal bearing medium used to convey the distribution. Moreover, the foregoing relates to exemplary embodiments of the invention and modifications may be made without departing from the spirit and scope of the invention, as set forth in the following claims.

What is claimed is:

1. A method for protecting a password assigned to a user for access to a computer network, said method comprising:
   determining if the user is on a trusted network and if the user is on said trusted network, authenticating the user if the password supplied by the user matches a user password retrieved from a password database; providing a password entry screen displayed on a computer monitor having a virtual keyboard, said virtual keyboard including a plurality of letter keys and number keys arranged in a non-QWERTY format where, when providing said password entry screen, a different random array of letter keys and number keys is generated on said virtual keyboard each time any user accesses said password entry screen to mitigate attempts of illicit monitoring of mouse movements entered by the user, said random array of letter keys and number keys configurable to include at least one blank key as a null character that has no substantive effect when clicked on by a mouse cursor during password entry and can be clicked on to provide erroneous data to said illicit monitoring, at least one duplicate of a letter key where either said duplicate or said letter key can be clicked on by said mouse and have a same effect during password entry and can provide further erroneous data to said illicit monitoring when the user alternates between using said duplicate key and said letter key, and at least one glyph of said letter keys in an OCR-resistant format where said glyph is altered to mitigate attempts of illicit OCR recognition of said glyph, wherein said OCR-resistant format comprises a glyph from the group consisting of: vertical background lines, horizontal background lines, speckles, image noise, and geometric character distortion or rotation;
   requesting that a portion of the password be entered into the password entry screen where, if said portion has fewer letters and numbers than the password, said portion comprises a random selection of letters and numbers in the password thus mitigating attempts of illicit capturing of a complete password, wherein said requesting further comprises displaying on said password entry screen a password letter or number entry progress indication where entered letters and numbers, by the user, are represented by an indicating character that can be an asterisk;
   authenticating the user if said portion of the password submitted by the user accessing said password entry screen matches a portion of said user password retrieved from a password database; and
   denying access to the user if said submitted password does not match said retrieved user password in a predetermined amount of attempts by the user to enter the password.

* * * * *